Jan. 8, 1924.

L. BLACKMORE

SHACKLE BOLT

Filed March 13, 1922

1,480,342

Inventor
Lloyd Blackmore

Patented Jan. 8, 1924.

1,480,342

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

SHACKLE BOLT.

Application filed March 13, 1922. Serial No. 543,365.

*To all whom it may concern:*

Be it known that I, LLOYD BLACKMORE, a citizen of the United States, and a resident of Highland Park, county of Wayne, and State of Michigan, have invented certain new and useful Improvements in Shackle Bolts, of which the following is a full, clear, concise, and exact description, such as will enable others skilled in the art to which the invention relates to make and use the same, reference being made therein to the accompanying drawings, which form a part of this specification.

My invention relates to shackle bolts such as are used, for example, for supporting the ends of the springs which in turn support the frame and body of an automobile or similar self-propelled vehicle, and which bolts commonly include means for lubricating the bearing between the bolt and the spring end or other device supported thereby; although bolts made in accordance with my invention are equally capable or use in other relations, and in fact in any situation where a shackle or equivalent bolt having lubricating means associated therewith, is necessary or desirable.

The object of my invention is to provide an improved combined shackle bolt and lubricating device therefor, or shackle bolt having lubricating means incorporated therewith or thereinto, and in which the passage through which oil is supplied to the peripheral surface thereof and to the bearing between said surface and the part supported will be automatically kept open when the device is in use, so that the lubricating function will not be interfered with by the clogging of the said passage; which is a fault frequently present in lubricated shackle bolts at present in use and which results in excessive wear between the parts, and in squeaking and other objectionable noises at the spring shackles of motor vehicles.

The drawing accompanying and forming a part of this application illustrates the preferred form of my invention; although my invention may be embodied in other forms the equivalent of the form shown, and includes all such variations and modifications of the particular form shown as come within the scope of the concluding claims, wherein the distinguishing features of my invention are particularly pointed out.

Figure 1:
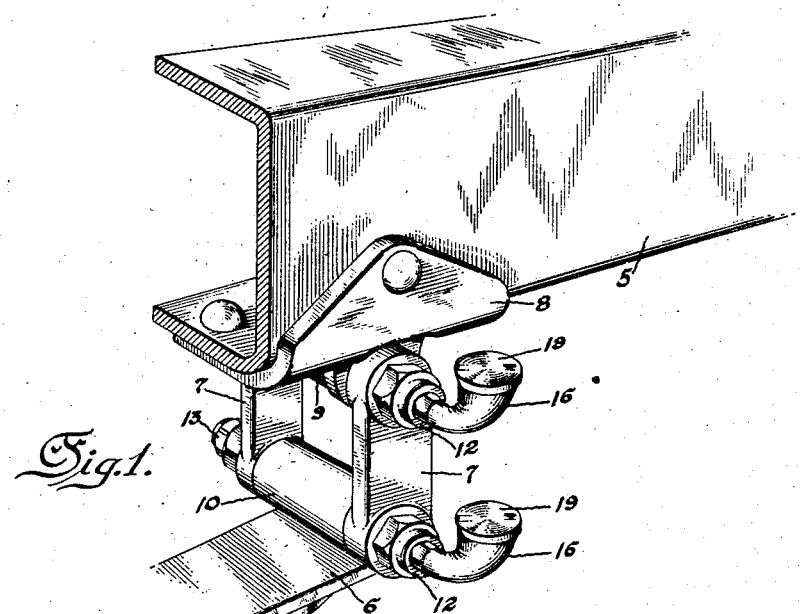
Figure 1 is a fragmentary perspective view showing two of my improved shackle bolts used in the spring suspension system of a motor driven vehicle.

Referring now to the drawing, the reference numeral 5 designates a portion of one of the two longitudinally extending frame bars; 6 an end of one of a plurality of springs whereby the frame and the body carried thereby are supported from the axles of the vehicle; and 7, 7 two shackle links the lower ends of which are connected with the spring end by one of my improved shackle bolts; and the upper ends of which are connected with a bracket 8 secured to the frame member by another bolt. Extending between the upper ends of the links is a sleeve 9 which may be integral with the links or separate therefrom; and the free end 10 of the spring is commonly curled to form an eye or tube which extends between the lower ends of the links, and may or may not contain a bushing in immediate contact with the peripheral surface of the lower shackle bolt.

The reference numeral 11 designates my improved shackle bolt, the same extending through the ends of the shackle links and through the spacing sleeve 9 or spring eye 10, and having a head 12 at one end and a nut 13 at the other, as will be understood. This bolt is provided with an internal longitudinally extending passage 14, and with a slot 15 leading from said passage to the peripheral surface thereof and through which oil from the passage is supplied to the bearing between said peripheral surface and the interior of the sleeve, spring eye, bushing, or other element surrounding said bolt and supported thereby.

Communicating with the passage 14 is an oil cup 16 made, preferably, separate from the shackle bolt proper 11; and shown as having a threaded portion at the end of said passage 14, as indicated at 17. The open end 18 of this oil cup is in a plane which is approximately parallel with the axis of the bolt, and one which is substantially horizontal when the device is in use; and said open end is closed by a swinging cover 19 pivotally connected with the body of the oil cup as by a hinge connection at 20.

The reference numeral 21 designates a reciprocating slot cleaning member located within the passage 14 and movable along the same; the outer end of said member being connected with the cover 19 so that it will be moved along the passage 14 as the cover is opened and closed, and the inner end thereof terminating adjacent the slot or groove 15 so that it will move along the same at such times, and break up and scrape away such hard deposit of contaminated lubricating material as may have accumulated at the slot and which acts to interfere with the free flow of oil through the slot and to the bearing at the peripheral surface of the bolt. This slot cleaning member is shown as made from a piece of wire curved in form and the middle portion of which rests against the interior of the passage 14 opposite the slot 15, so that the inherent resilience of the wire will keep the hooked end 22 thereof within the said slot; along which it moves as the cover is raised and lowered, as will be appreciated. The outer end of the wire 21 is conveniently fastened to the cover by forming a struck-up loop or eye 23 from the metal thereof, and hooking the end of the wire through the loop as shown.

In view of the premises it will be appreciated that the inner free end of the slot cleaning member will move along the slot 15 each time the cover 19 is raised to replenish the supply of oil within the oil cup and passage 14 in the shackle bolt, and again as the cover is returned to its normally closed position; thus keeping the passage through which oil flows to the bearing to be oiled open without special attention on the part of the user of the device.

Figure 2:
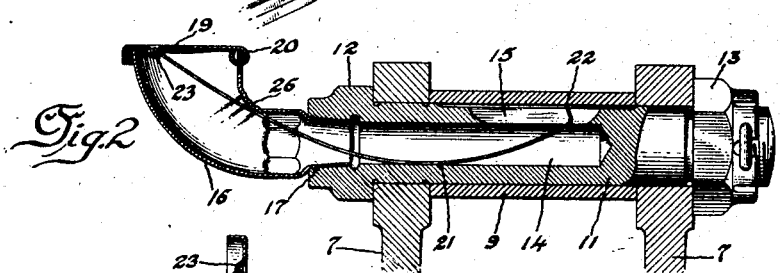
Figure 2 is a view showing my invention in section upon a longitudinal central plane the cover of the oil cup being closed.
Figure 3:
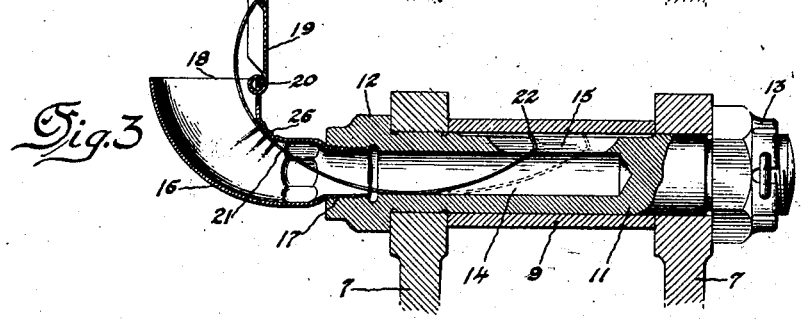
Figure 3 is a similar view showing the cover open so that oil may be supplied to the oil cup and to the interior passage extending along the bolt.
Figure 4:
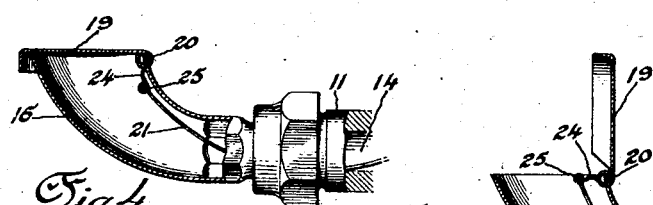
Figures 4 and 5 are fragmentary views showing a modified form of my invention.
Figure 5:

In the form of my invention illustrated in Figures 4 and 5 the cover 19 is provided with an extended arm 24 to which the outer end of the spring 21 is connected, so that as the cover is raised said arm will be swung from the position shown in Figure 4 into the position shown in Figure 5. The point of pivotal connection 25 between the cleaning member 21 and the arm 24 is located about in line with the arm and cleaning member when the cover is closed, or slightly past such a line; so that when the cover is closed any upward force exerted by the wire 21 due to its resiliency will tend to keep the cover in a closed position; which is a feature of advantage under some circumstances. It is obvious, however, that the cleaning wire when in the position illustrated in Figure 2 will exert little or no force tending to open the cover 19; as it will be appreciated that the said wire bears against the interior of the oil cup 16 at the point 26, and is bent about said point of contact as the cover is opened. This contact, however, between the wire and interior of the oil cup is a feature which is not essential to the operation of my invention, as the free end 22 of the wire will obviously be moved along the slot 15 whether or not there is contact between the wire or equivalent cleaning member and the interior of the oil cup, as illustrated in Figures 2 and 3 of the drawing.

Having thus described and explained my invention, I claim and desire to secure by Letters Patent:

1. A shackle bolt having a passage extending longitudinally thereof, and a slot through which said passage communicates with the peripheral surface of the bolt; an oil cup communicating with said passage and through which oil may be supplied thereto; a cover pivotally connected with said oil cup for closing the same; and a curved and resilient reciprocating cleaning wire operating within said passage and the middle portion of which contacts with the interior thereof opposite said slot, one end of said wire being pivotally connected with said cover so as to be operated thereby and the other end thereof being held in place within said slot by the resilience of said wire, and which last mentioned end moves along said slot as said cover is operated.

2. A shackle bolt having a passage extending longitudinally thereof, and a slot through which said passage communicates with the peripheral surface of the bolt; an oil cup communicating with said passage and through which oil may be supplied thereto; a cover pivotally connected with said oil cup for closing the same; and a curved reciprocating cleaning member operating within said passage and the middle portion of which contacts with the interior thereof opposite said slot, one end of said member being permanently connected with said cover so as to be operated thereby and the free end of which member extends into and moves along the slot aforesaid when said cover is operated.

3. A shackle bolt having a passage extending longitudinally thereof, and a slot through which said passage communicates with the peripheral surface of the bolt; an oil cup communicating with said passage and having an inlet opening disposed in a substantially horizontal plane when the device is in use; a cover pivotally connected with said oil cup and adapted to close the opening aforesaid leading thereinto; and a reciprocating cleaning member one end of which is permanently connected to said cover so as to be operated thereby, and which member extends along said passage and into the slot aforesaid, and moves along said slot as said cover is opened and closed.

4. A shackle bolt having a passage extending longitudinally thereof, and a slot through which said passage communicates with the peripheral surface of the bolt; an oil cup communicating with said passage and having an inlet opening disposed in a substantially horizontal plane when the device is in use; a cover hinged to said oil cup and adapted to close the opening aforesaid leading thereinto; and a reciprocating cleaning member permanently connected with said cover and extending along said passage, and having a portion which moves along said slot when said cover is opened and closed.

5. A shackle bolt having a passage extending longitudinally thereof, and a slot through which said passage communicates with the peripheral surface of the bolt; an oil cup communicating with said passage and having an inlet opening disposed in a plane which is substantially parallel with the axis of said bolt; a cover hinged to said oil cup and adapted to close the opening aforesaid leading thereinto; a reciprocating cleaning member pivotally connected with and operated by said cover and extending along said passage and having a portion extending into the slot aforesaid; and means for holding said portion in place within said slot as said cover is opened and closed.

6. A shackle bolt having a passage extending longitudinally thereof, and a slot through which said passage communicates with the peripheral surface of the bolt; an oil cup communicating with said passage and having an inlet opening disposed in a plane which is substantially parallel with the axis of said bolt; a cover hinged to said oil cup and adapted to close the opening aforesaid leading thereinto; and a resilient reciprocating cleaning wire extending along said passage and one end of which is permanently connected with said cover so as to be operated thereby; said wire being curved in form and the middle portion thereof contacting with the interior of said passage, and the other end thereof extending into and moving along the slot aforesaid as said cover is opened and closed.

In testimony thereof I affix my signature.

LLOYD BLACKMORE.